United States Patent
Katayama et al.

(10) Patent No.: US 8,257,862 B2
(45) Date of Patent: Sep. 4, 2012

(54) ALKALINE STORAGE BATTERY

(75) Inventors: Yoshinobu Katayama, Naruto (JP); Shuhei Yoshida, Naruto (JP); Hiromasa Sugii, Itano-gun (JP); Yasuyuki Harada, Naruto (JP); Yoshihiro Masuda, Itano-gun (JP); Makoto Ochi, Myozai-gun (JP); Masao Takee, Itano-gun (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 483 days.

(21) Appl. No.: 12/067,663

(22) PCT Filed: Sep. 15, 2006

(86) PCT No.: PCT/JP2006/318430
§ 371 (c)(1),
(2), (4) Date: Mar. 19, 2010

(87) PCT Pub. No.: WO2007/034760
PCT Pub. Date: Mar. 29, 2007

(65) Prior Publication Data
US 2010/0167122 A1 Jul. 1, 2010

(30) Foreign Application Priority Data
Sep. 21, 2005 (JP) .................. 2005-273569

(51) Int. Cl.
*H01M 10/26* (2006.01)
(52) U.S. Cl. .................. 429/206; 429/218.2
(58) Field of Classification Search .................. 429/206, 429/218.2
See application file for complete search history.

(56) References Cited

U.S. PATENT DOCUMENTS
2002/0182496 A1 12/2002 Morishita et al.

FOREIGN PATENT DOCUMENTS
| | | |
|---|---|---|
| EP | 1 249 885 A2 | 10/2002 |
| JP | 11-162459 A | 6/1999 |
| JP | 2002-105564 A | 4/2002 |
| JP | 2002-313432 A | 10/2002 |
| JP | 2004-115870 A | 4/2004 |
| JP | 2005-032573 A | 2/2005 |
| JP | 2005-248252 A | 9/2005 |

OTHER PUBLICATIONS

International Search Report of PCT/JP2006/318430, date of mailing Dec. 5, 2006.
Form PCT/IB/338 Notification of Transmittal of Translation of the International Preliminary Report on Patentability; Form PCT/IB/373 International Report on Patentability; Form PCT/ISA/237 Written Opinion of the International Searching Authority issued in corresponding International Application No. PCT/JP2006/318430 mailed Apr. 3, 2008.

*Primary Examiner* — Edward Cain
(74) *Attorney, Agent, or Firm* — Westerman, Hattori, Daniels & Adrian, LLP (57) ABSTRACT

Disclosed is an alkaline storage battery comprising a negative electrode, a positive electrode, a separator and an alkaline electrolyte solution in a package can. The negative electrode contains a hydrogen storage alloy represented by the following general formula: $Ln_{1-x}Mg_x(Ni_{1-y}T_y)_z$ (wherein Ln represents at least one element selected from lanthanoid elements, Ca, Sr, Sc, Y, Ti, Zr and Hf; T represents at least one element selected from V, Nb, Ta, Cr, Mo, Mn, Fe, Co, Al, Ga, Zn, Sn, In, Cu, Si, P and B; and $0<x\leq1$, $0\leq y\leq0.5$ and $2.5\leq z\leq4.5$) as a negative electrode active material. In this alkaline storage battery, the hydrogen equilibrium pressure (P) is regulated to satisfy $0.02\ MPa\leq P\leq0.11\ MPa$ when the hydrogen amount stored in the hydrogen storage alloy (H/M (atomic ratio)) at 40° C. is 0.5.

4 Claims, 4 Drawing Sheets

ALKALINE STORAGE BATTERY

TECHNICAL FIELD

The present invention relates to an alkaline storage battery comprising a negative electrode that has a hydrogen storage alloy as a negative electrode active material, and particularly relates to an alkaline storage battery comprising a negative electrode that has, as a negative electrode active material, a hydrogen storage alloy that has exceptional assist output characteristics and regeneration output characteristics.

BACKGROUND ART

The use of secondary batteries (storage batteries) has become widespread over the past several years, extending across a broad range of application; e.g., cellular telephones, notebook personal computers, electric tools, electric bicycles, hybrid vehicles (HEV), and electric automotive vehicles (EV). Among these applications, nickel-hydrogen storage batteries have been used as a power source for electric tools, electric bicycles, HEVs, EVs, and other devices that require high output. An $LaNi_5$ ($AB_5$) hydrogen storage alloy is used as the negative electrode active material in such nickel-hydrogen storage batteries.

The amount of hydrogen stored in the hydrogen storage alloy is expressed in terms of a 1:1 ratio between the alloy and the hydrogen atoms, and it is substantially difficult to store a greater proportion of hydrogen. A dramatic increase in the quantities of secondary batteries introduced commercially with even higher capacities cannot be expected as long as $LaNi_5$ hydrogen storage alloys are used. Conversely, with Laves phase ($AB_2$) hydrogen storage alloys, which have a Laves phase as the main phase, it is known that one or more hydrogen atoms can be stored for each alloy, and a high-capacity secondary battery can be theoretically obtained. However, it has not yet been possible to use such hydrogen storage alloys as a negative electrode material because, e.g., a stable oxide film forms on the surface of the hydrogen storage alloy.

In contrast to the above, a recently discovered hydrogen storage alloy, whose main constituent elements are magnesium, nickel, and a rare-earth element, is characterized in having higher capacity in terms of volume and mass than the $LaNi_5$ hydrogen storage alloy, having a higher rate of activation than the Laves phase hydrogen storage alloy, and having exceptional high-efficiency charge and discharge properties. Accordingly, using this hydrogen storage alloy makes it possible to achieve higher capacitance than the $LaNi_5$ hydrogen storage alloy, and to yield high-efficiency charge and discharge properties that are superior to those of the Laves phase hydrogen storage alloy.

A hydrogen storage alloy of the above description, having magnesium, nickel, and a rare-earth element as main constituent elements, has been proposed in Patent Reference 1 (Japanese Laid-open Patent Application No. 11-162459). The hydrogen storage alloy proposed in Patent Reference 1 is represented by the general formula $(R_{1-x}Mg_x)Ni_yA_z$ (wherein R represents at least one element selected from the group including a rare-earth element (including yttrium), Ca, Zr, and Ti; A represents at least one element selected from the group including Co, Mn, Fe, V, Cr, Nb, Al, Ga, Zn, Sn, Cu, Si, P, and B; and $0<x<1$, $0\leq z\leq 1.5$, $2.5\leq y+z\leq 4.5$.)

In this case, x, which is the substitution amount of Mg with respect to R, is set in a range of $0<x<1$, thereby remedying the problem of hydrogen not being readily released, and enabling a high discharge capacitance to be achieved. Setting the amount z of A such that $0\leq z\leq 1.5$ makes it possible to improve the rate of hydrogen storage and release as well as other characteristics of the hydrogen storage alloy; and to dramatically improve the cycle characteristics of the nickel-hydrogen storage battery. In an alkaline secondary battery comprising a hydrogen storage alloy containing an A element, the cycle characteristics can be improved, and the discharge capacity can be improved particularly when Co is used as the A element.

With the amount y+z of Ni and A contained in the hydrogen storage alloy being within a range of 2.5 or greater, the rate at which hydrogen is stored and released, and other hydrogen storage/releasing characteristics of the hydrogen storage alloy can be dramatically improved, a high discharge capacitance can be achieved, and the cycle characteristics are improved. However, when y+z is set to 4.5 or greater, the hydrogen sites in the alloy decrease in number, the hydrogen storage capacity decreases, and the discharge capacity decreases as well.

Nickel-hydrogen storage batteries as described above are being increasingly used in assisted bicycles, HEVs, EVs, and the like; and the demand for larger batteries and higher power is increasing. In view of this, a proposal has been made in Patent Reference 2 (Japanese Laid-open Patent Application No. 2005-32573) for increasing the hydrogen equilibrium pressure (P) in a hydrogen storage alloy whose main constituent elements are magnesium, nickel, and a rare-earth metal element. As is taught in Patent Reference 2, increasing the hydrogen equilibrium pressure of the hydrogen storage alloy brings about an increase in the hydrogen concentration and an improvement in the discharge characteristics (a decrease in the overvoltage). As is also taught, increasing the hydrogen equilibrium pressure of the hydrogen storage alloy brings about an increase in the open circuit voltage of the battery, and an improvement in the discharge characteristics.

[Patent Reference 1] Japanese Laid-Open Patent Application No. 11-162459

[Patent Reference 2] Japanese Laid-Open Patent Application No. 2005-32573

DISCLOSURE OF THE INVENTION

Problems the Invention is Intended to Solve

In alkaline storage batteries used in HEV applications, for example, it is necessary to simultaneously provide satisfactory output characteristics (battery output characteristics needed for driving a motor; i.e., discharge characteristics) and regeneration output characteristics (charging characteristics necessary to recover energy generated when braking), and to improve fuel consumption. As disclosed in Patent Document 2 above, when the hydrogen equilibrium pressure (P) of the hydrogen storage alloy is increased, the assist output characteristics can be improved, but the regeneration output characteristics are degraded, and a problem arises in that it is difficult to simultaneously improve the assist output characteristics and the regeneration output characteristics.

The problem arises presumably because when the hydrogen equilibrium pressure (P) of the hydrogen storage alloy is increased as described above, the reaction resistance of the hydrogen storage alloy during charging will increase, and the regeneration output characteristics will deteriorate. Another probable reason is that the voltage difference decreases to a prescribed voltage (an upper limit voltage of a battery set according to a member withstand voltage) during charging as a result of an increase in the open circuit voltage caused by increasing the hydrogen equilibrium pressure (P) of the hydrogen storage alloy, and the ability of the battery to receive a charge is degraded.

The present invention was accordingly devised in order to solve the above-mentioned problems, and an object thereof is to provide an alkaline storage battery in which the assist output and regeneration output characteristics are both improved, without either one being degraded.

Means for Solving the Abovementioned Problems

An alkaline storage battery, comprising a negative electrode that has, as a negative electrode active material, a hydrogen storage alloy that is represented by the general formula $Ln_{1-x}Mg_x(Ni_{1-y}T_y)_z$ (wherein Ln represents at least one element selected from the group comprising a lanthanoid element, Ca, Sr, Sc, Y, Ti, Zr, and Hf; T represents at least one element selected from the group comprising V, Nb, Ta, Cr, Mo, Mn, Fe, Co, Al, Ga, Zn, Sn, In, Cu, Si, P, and B; $0<x\leq1$; $0\leq y\leq0.5$; and $2.5\leq z\leq4.5$); a positive electrode; a separator; and an alkaline electrolyte solution, which are provided inside a package can. The lanthanoid element Ln in the present invention indicates at least one type of element selected from the group comprising La, Ce, Pr, Nd, Sm, Eu, Gd, Tb, Dy, Ho, Er, Tm, Yb, and Lu.

In the alkaline storage battery of the present invention, an equilibrium pressure P of the hydrogen storage alloy is 0.02 MPa$\leq$P$\leq$0.11 MPa, when the hydrogen storage amount (H/M (atomic ratio)) of 0.5 and at 40° C. The hydrogen equilibrium pressure (P) in this case indicates the hydrogen equilibrium pressure of the hydrogen storage alloy directly after manufacture, and indicates a value that is substantially not different from the hydrogen equilibrium pressure after the battery is activated. It is undesirable for the hydrogen equilibrium pressure (P) to be less than 0.02 MPa, because the ability to release hydrogen will dramatically deteriorate, and the battery performance will be unsatisfactory. It is also undesirable for the hydrogen equilibrium pressure (P) to exceed 0.11 MPa, because the battery characteristics will deteriorate as a result of an increase in pressure during storage and a dramatic increase in the hydrogen concentration in the battery.

The hydrogen storage alloy represented by the general formula described above thus has excellent assist output characteristics. Consequently, when the alloy is used as a negative electrode active material, a nickel-hydrogen secondary battery that has excellent assist output characteristics can be obtained. When the hydrogen equilibrium pressure (P) of the hydrogen storage alloy is set so that 0.02 MPa$\leq$P$\leq$0.11 MPa when the H/M is 0.5 at 40° C., it is clear that the regeneration output characteristics do not deteriorate, even when the assist output characteristics are improved. Therefore, setting the hydrogen equilibrium pressure (P) of the hydrogen storage alloy as described above makes it possible to provide an alkaline storage battery that has excellent assist output characteristics and regeneration output characteristics.

In this case, it preferable for the hydrogen storage alloy represented by the general formula $Ln_{1-x}Mg_x(Ni_{1-y}T_y)_z$ to be one in which the percentage of Nd in Ln is 97% or greater; and the relationships $0<x\leq0.2$, $0<y\leq0.5$, and $3.4\leq z\leq4.5$ are satisfied. This is because the assist output characteristics and the regeneration characteristics tend to be even better when such an alloy is used. It is even more preferable that $0.09\leq x\leq0.2$; $0<y\leq0.5$; and $3.4\leq z\leq4.5$.

An average particle diameter R of the hydrogen storage alloy is preferably such that 15 μm$\leq$R$\leq$35 μm. The reason for this is that the relationship between the surface area of the alloy and the reaction resistance will be optimal when the average particle diameter R of the hydrogen storage alloy is 35 μm or less, but the corrosion resistance properties will deteriorate dramatically when the particle diameter R of the hydrogen storage alloy is less than 15 μm.

When a surface area of the negative electrode is assumed to be A ($m^2$) and the battery capacity is assumed to be S ($m^3$), a ratio A/S of the negative electrode surface area to the battery capacity is preferably such that A/S$\geq1.59\times10^3$/m. The reason for this is that the assist output characteristics and the regeneration output characteristics tend to similarly deteriorate in concert with a decrease in the ratio A/S of the negative electrode surface area to the battery capacity, but the regeneration output characteristics will rapidly deteriorate when A/S is less than $1.59\times10^3$/m.

KEY TO SYMBOLS

A Nickel-hydrogen storage battery
10 Hydrogen storage alloy negative electrode
11 Negative electrode collector body
12 Negative electrode active material
13 Negative electrode collector body
20 Nickel positive electrode
21 Core body
22 Nickel sintered body
23 Positive electrode active material
24 Positive electrode collector body
24a Lead part
30 Separator
40 Metal package can
41 Annular groove part
42 Crimped part
50 Sealed opening body
51 Lid body
52 Positive electrode cap
53 Gas extraction hole
54 Valve body
54a Spring seat
55 Coil spring
56 Sealed opening gasket

BEST MODE FOR CARRYING OUT THE INVENTION

Figure 1:
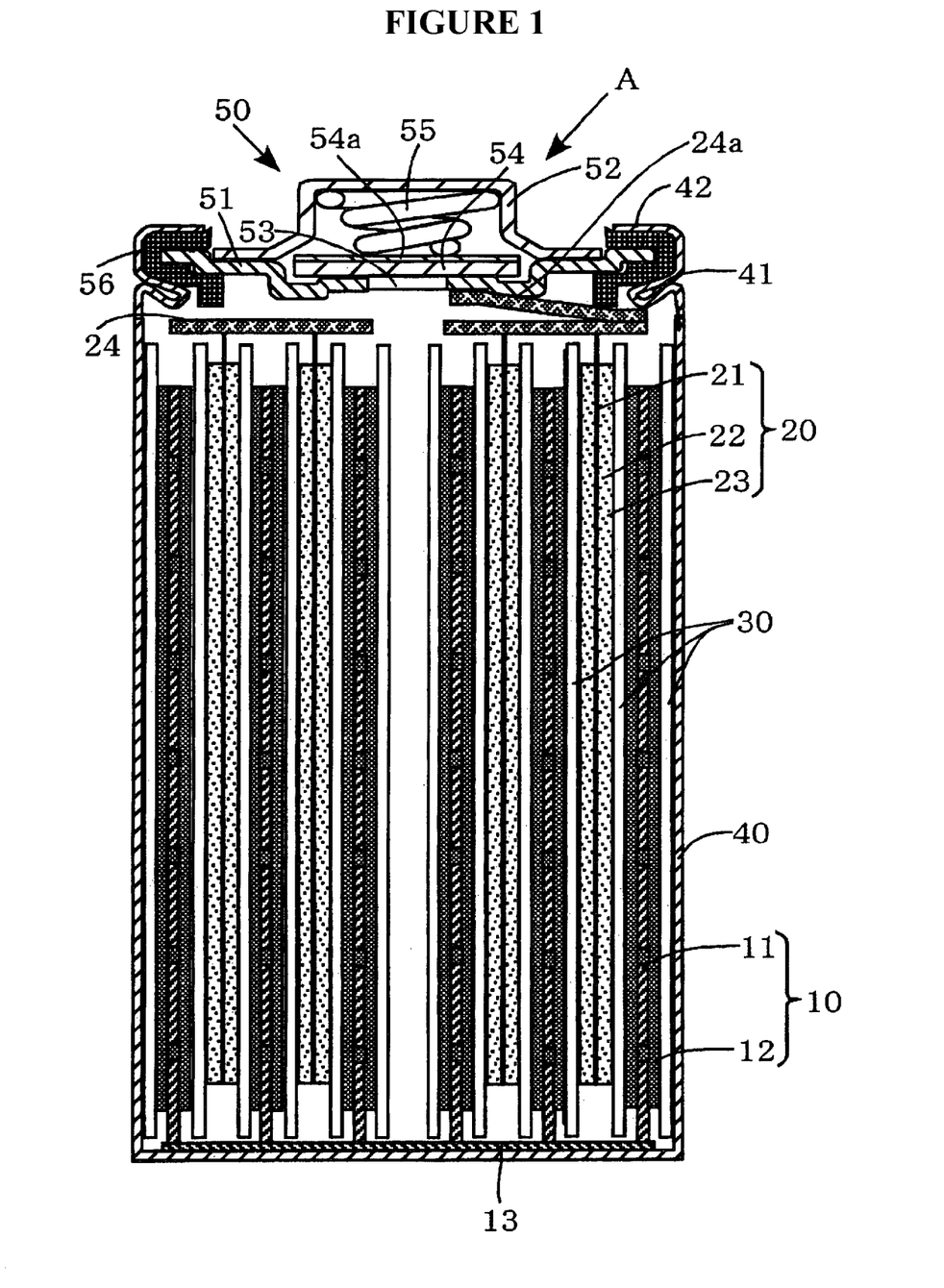
FIG. 1 is a sectional view schematically showing an alkaline storage battery of the present invention.
Figure 2:
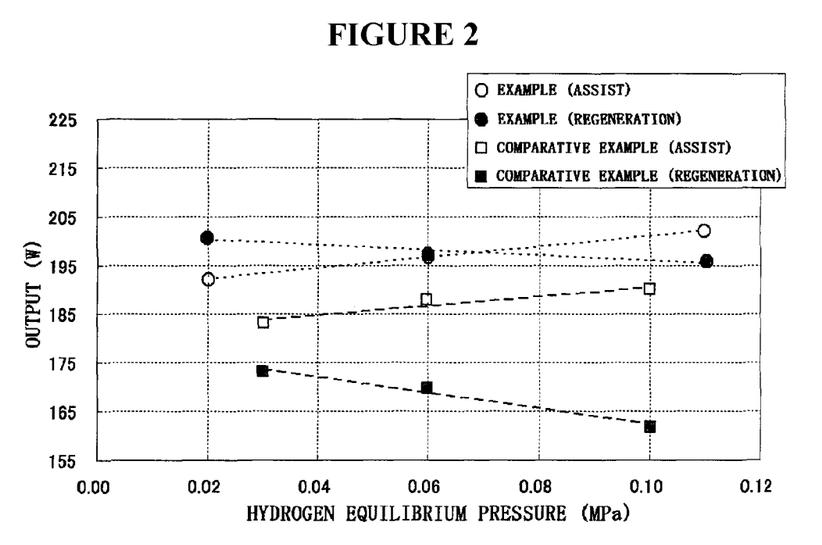
FIG. 2 is a graph showing a relationship between the hydrogen equilibrium pressure (MPa), the assist output (W), and the regeneration output (W)
Figure 3:
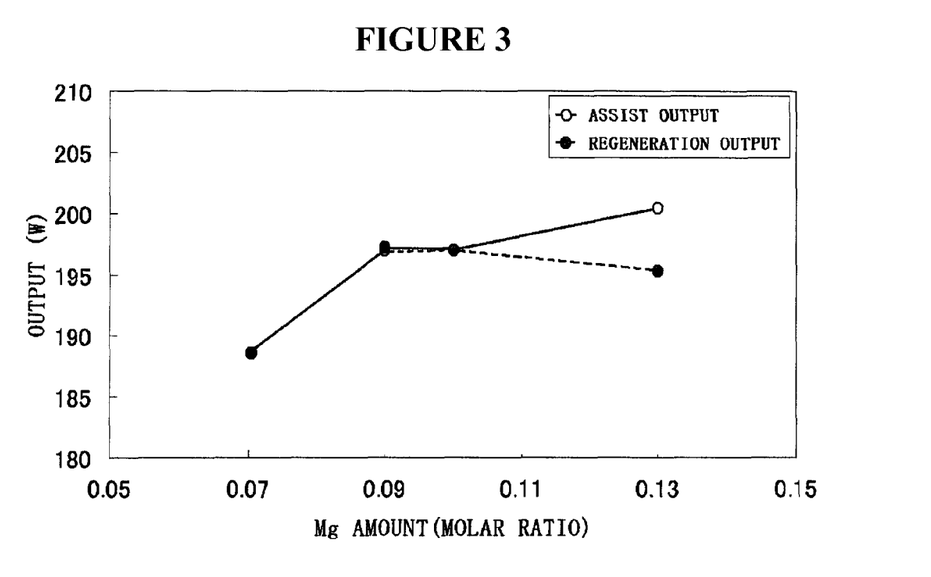
FIG. 3 is a graph showing a relationship between the amount of Mg (molar ratio), the assist output (W), and the regeneration output (W)
Figure 4:
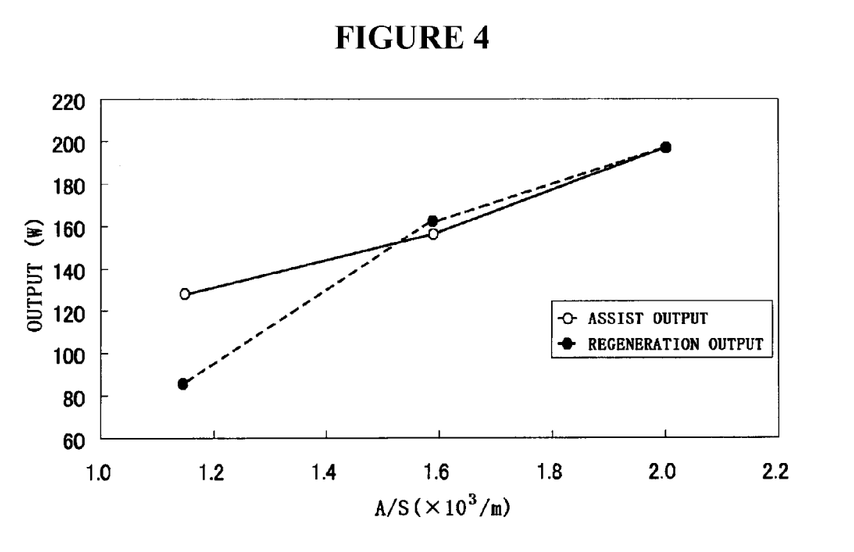
FIG. 4 is a graph showing a relationship between the ratio (A/S) of negative electrode surface area (A) to the battery capacity (S); the assist output (W); and the regeneration output (W).

Embodiments of the present invention will be described in detail below, but the present invention is not limited thereto; suitable modifications may be implemented within a range that does not change the main point of the present invention. FIG. 1 is a sectional view schematically showing an alkaline storage battery of the present invention. FIG. 2 is a graph showing a relationship between the hydrogen equilibrium pressure (MPa), the assist output (W), and the regeneration output (W). FIG. 3 is a graph showing a relationship between the amount of Mg (molar ratio), the assist output (W), and the regeneration output (W). FIG. 4 is a graph showing a relationship between the ratio (A/S) of negative electrode surface area (A) to the battery capacity (S); the assist output (W); and the regeneration output (W).

1. Hydrogen Storage Alloy (1)

A misch metal (Mm, primary constituents: 20 mass % lanthanum (La), 40 mass % neodymium (Nd), and 40 mass % praseodymium (Pr)), magnesium (Mg), nickel (Ni), and aluminum (Al) were mixed at a prescribed molar ratio proportion. The mixture was then melted in a high-frequency induction oven having an argon gas atmosphere, and a molten alloy metal was obtained. The molten alloy metal was poured into a die using a known method and cooled, resulting in an ingot of a hydrogen storage alloy having a composition expressed as $Mm_{0.08}Mg_{0.2}(Ni_{0.94}Al_{0.06})_{3.3}$. The hydrogen storage alloy was mechanically crushed in an inert atmosphere, and the remaining alloy powder was sorted to between 400 mesh and 200 mesh using screening. The particle size distribution was measured using a laser diffraction/scattering particle size distribution measuring device, resulting in an average particle diameter of 25 μm which corresponds to a mass score of 50%. The alloy powder was designated as hydrogen storage alloy powder α.

(2) Hydrogen Storage Alloy Powders β1 to β5

Neodymium (Nd), magnesium (Mg), nickel (Ni), cobalt (Co), and aluminum (Al) were mixed at prescribed molar ratio proportions. The mixtures were then melted in a high-frequency induction oven having an argon gas atmosphere, and molten alloy metals were obtained. The molten alloy metals were poured into a die using a known method, and were cooled. Five types of hydrogen storage alloy ingots are manufactured, the compositions thereof are expressed as follows:

The hydrogen storage alloys were mechanically crushed in an inert atmosphere, and the remaining alloy powders were sorted to between 400 mesh and 200 mesh using screening. The particle size distribution was measured using a laser diffraction/scattering particle size distribution measuring device, resulting in an average particle diameter of 25 μm, which corresponds to a mass score of 50%. The alloy powders were sequentially designated as the hydrogen storage alloy powders β1 to β5.

(3) Hydrogen Storage Alloy Powders γ1 to γ3

A misch metal (Mm, primary constituents: 40 mass % lanthanum (La), 40 mass % cerium (Ce), 10 mass % neodymium (Nd), and 10 mass % praseodymium (Pr)), magnesium (Mg), nickel (Ni), and aluminum (Al) were mixed at prescribed molar ratio proportions. The mixtures were then melted in a high-frequency induction oven having an argon gas atmosphere, and molten alloy metals were obtained. The molten alloy metals were poured into a die using a known method, and were cooled. Three types of hydrogen storage alloy ingots were manufactured, the compositions thereof were expressed as follows:

The hydrogen storage alloys were mechanically crushed in an inert atmosphere, and the remaining alloy powders were sorted to between 400 mesh and 200 mesh using screening. The particle size distribution was measured using a laser diffraction/scattering particle size distribution measuring device, resulting in an average particle diameter of 25 μm, which corresponds to a mass score of 50%. The alloy powders were sequentially designated as the hydrogen storage alloy powders γ1 to γ3.

(4) Hydrogen Storage Alloy Negative Electrode

Each of the resulting hydrogen storage alloy powders α, β1 to β5, γ1 to γ3 was used, and 100 mass parts of each powder was compounded with 0.5 mass parts of SBR (styrene butadiene latex) and 0.3 mass parts of CMC (carboxymethyl cellulose) were added as binders, together with a suitable amount of water. The mixture was kneaded to manufacture negative electrode active material slurries. The negative electrode active material slurries were applied on both sides of a punched metal negative electrode collector body 11, and then dried. The negative electrode collector body was then rolled out to a prescribed thickness and cut to a prescribed size to manufacture hydrogen storage alloy negative electrodes 10 having 11 types of negative electrode active material 12, which corresponded to Examples 1 through 8 and Comparative Examples 1 to 3.

The hydrogen storage alloy powder α was used to form a negative electrode a that was manufactured so as to have a surface area of 0.0998 m². The hydrogen storage alloy powders β1 to β5 were used to form negative electrodes b1 to b5, respectively, which were manufactured so as to have surface areas of 0.0998 m². The hydrogen storage alloy powder β1 was used to form a negative electrode b6 that was manufactured so as to have a surface area 0.0760 m². The hydrogen storage alloy powder β3 was used to form a negative electrode b7 that was manufactured so as to have a surface area of 0.0665 m². The hydrogen storage alloy powders γ1 to γ3 were used to form negative electrodes c1 to c3, respectively, which were manufactured so as to have a surface area of 0.0998 m².

2. Nickel Positive Electrode

A porous nickel sintered body 22 was formed on a surface of a punched metal core body 21, the porous nickel sintered body 22 was immersed in a mixed aqueous solution containing nickel nitrate, cobalt nitrate, and zinc nitrate (impregnating solution). Nickel nitrate, cobalt nitrate, and zinc nitrate were thereby retained in the pores of the porous nickel sintered body 22. The porous nickel sintered body 22 was then immersed in an aqueous solution of 25 wt % sodium hydroxide (NaOH), and the nickel nitrate, cobalt nitrate, and zinc nitrate were converted to nickel hydroxide, cobalt hydroxide, and zinc hydroxide, respectively.

The porous nickel sintered body 22 was adequately washed, an alkaline solution was removed, and drying was performed. The pores of the porous nickel sintered body 22 were filled with an active material primarily comprising nickel hydroxide. This active material filling operation was repeated a prescribed number of times (e.g., six). The pores of the porous nickel sintered body 22 were filled with the positive electrode active material 23, which primarily comprises nickel hydroxide, resulting in a filling density of 2.5 g/cm³. The porous nickel sintered body was then dried at room temperature and cut to prescribed dimensions to manufacture a nickel positive electrode plate 20.

3. Nickel-Hydrogen Storage Battery

A separator 30 comprising a polypropylene non-woven fabric was then prepared. The separator 30 was interposed between the hydrogen storage alloy negative electrode 10 and the nickel positive electrode 20 manufactured as described above. This assembly was wound into a spiral shape, and a spiral-shaped electrode group was manufactured. A negative electrode collector body 13 was resistance-welded to a lower part of the resulting spiral-shaped electrode group, a positive electrode collector body 24 was resistance-welded to an upper part of the spiral-shaped electrode group, and respective spiral-shaped electrode bodies were manufactured. The spiral-shaped electrode bodies were inserted in a bottomed tubular metal package can 40, which is formed from nickel-plated iron. The negative electrode collector body 13 was then spot welded to a bottom part of the metal package can 40.

A sealed opening body 50, which comprises a lid body 51 and a positive electrode cap 52, was prepared. A lead part 24a provided to the positive electrode collector body 24 was brought into contact with a bottom part of the lid body 51, and the lead part 24a was welded to the bottom part of the lid body 51. An outer peripheral surface of the upper part of the metal package can 40 was subjected to a groove-forming process, and an annular groove part 41 was formed in the upper part of the metal package can 40. In the sealed opening body 50 comprising the lid body 51 and the positive electrode cap 52, a gas extraction hole 53 was formed in a center part of the lid body 51, and disk-shaped valve body 54 was disposed so as to block the gas extraction hole 53. A coil spring 55 was disposed between the positive electrode cap 52 and a spring seat 54a disposed on the disk-shaped valve body 54.

An electrolyte solution (a 7N potassium hydroxide (KOH) aqueous solution containing lithium hydroxide (LiOH) and sodium hydroxide (NaOH), wherein the lithium concentration was 0.05 mol/L) was poured into the metal package can 40. A sealed opening gasket 56, which is attached to the sealed opening body 50, was housed in the annular groove part 41 in the metal package can 40. A crimped part 42 at the distal end of the metal package can 40 was crimped, sealing the sealed opening body 50, and nickel-hydrogen storage batteries A of Examples 1 through 8 and Comparative Examples 1 through 3 were assembled. The negative electrode a was used in the battery of Example 1. The negative electrodes b1 through b7 were used in the batteries of Examples 2 through 8, respectively. The negative electrodes c1 through c3 were used in the batteries of Comparative Examples 1 through 3, respectively. In this case, the batteries of Examples 1 through 8 and Comparative Examples 1 through 3 were all D sized batteries (battery capacity (S): $4.77 \times 10^{-5} m^3$), which had a diameter of 32.3 mm and a height of 58.2 mm.

The batteries of Examples 1 through 8 and Comparative Examples 1 through 3 were activated as described before. Specifically, the batteries were charged to 120% of the state of charge (SOC) at a charge current of 1 It at 25° C., and charging was then halted for one hour. The batteries were then stored (aged) for 24 hours at 70° C., and subsequently discharged to a voltage of 0.3 V at a current of 1 It at 25° C. This cycle (comprising charging, non-charging, aging, and discharging) was repeated twice, and the batteries in Examples 1 through 8 and Comparative Examples 1 through 3 were activated.

4. Testing (1) Measurement of Hydrogen Equilibrium Pressure

Measurements were made of the hydrogen equilibrium pressure in the hydrogen storage alloy powders ($\alpha$, $\beta1$ to $\beta5$, and $\gamma1$ to $\gamma3$) that were used in the hydrogen storage alloy negative electrodes 10 (a, b1 to b7, c1 to c3), when the batteries of Examples 1 through 8 and Comparative Examples 1 through 3 were manufactured. The measurement results are shown in Table 1 and Table 2 described below. The hydrogen storage alloy powders used in this case were those powders obtained immediately after the alloy had been manufactured ($\alpha$, $\beta1$ through $\beta5$, $\gamma1$ through $\gamma3$) and those powders removed from the activated batteries after the batteries had been manufactured ($\alpha$, $\beta1$ through $\beta5$, $\gamma1$ through $\gamma3$). The "method for measuring a pressure-composition isotherm for hydrogen storage alloys (PCT curve)" according to JIS H7201 (1991) was used as a basis for measurements, with the hydrogen equilibrium pressure being the disassociation pressure when the hydrogen storage amount (H/M) was 0.5 in a 40° C. atmosphere. The results thereof are divided and shown in Tables 1 through 3. In Tables 2 and 3, data for the battery of Example 2 are also included for the purpose of comparison.

TABLE 1

|  | Composition | Composition type | Electrode plate type | Neg. electrode surface area ($m^2$) | A/S (1/m) |
|---|---|---|---|---|---|
| Example 1 | $Mm_{0.8}Mg_{0.2}(Ni_{0.94}Al_{0.06})_{3.3}$ | $\alpha$ | A | 0.0998 | $2.10 \times 10^3$ |
| Example 2 | $Nd_{0.9}Mg_{0.1}(Ni_{0.95}Co_{0.02}Al_{0.03})_{3.5}$ | $\beta1$ | b1 | 0.0998 | $2.10 \times 10^3$ |
| Example 3 | $Nd_{0.9}Mg_{0.1}(Ni_{0.95}Al_{0.05})_{3.7}$ | $\beta2$ | b2 | 0.0998 | $2.10 \times 10^3$ |
| Comparative Example 1 | $MmNi_{4.0}Co_{0.5}Al_{0.5}Mn_{0.2}$ | $\gamma1$ | c1 | 0.0998 | $2.10 \times 10^3$ |
| Comparative Example 2 | $MmNi_{4.1}Co_{0.5}Al_{0.4}Mn_{0.4}$ | $\gamma2$ | c2 | 0.0998 | $2.10 \times 10^3$ |
| Comparative Example 3 | $MmNi_{3.8}Co_{0.5}Al_{0.3}Mn_{0.5}$ | $\gamma3$ | c3 | 0.0998 | $2.10 \times 10^3$ |

| | Hydrogen equilibrium pressure (MPa) | | | | Difference |
|---|---|---|---|---|---|
| | immediately after manufacturing alloy | immediately after activation | Assist output (W) | Regeneration Output (W) | between assist and regeneration (W) |
| Example 1 | 0.02 | 0.03 | 192 | 201 | 9 |
| Example 2 | 0.06 | 0.07 | 197 | 197 | 0 |
| Example 3 | 0.11 | 0.11 | 202 | 196 | 6 |
| Comparative Example 1 | 0.10 | 0.10 | 190 | 162 | 28 |
| Comparative Example 2 | 0.06 | 0.06 | 188 | 170 | 18 |
| Comparative Example 3 | 0.03 | 0.03 | 183 | 173 | 10 |

TABLE 2

| | Composition | Composition type | Electrode plate type | Neg. electrode surface area ($m^2$) | A/S (1/m) |
|---|---|---|---|---|---|
| Example 4 | $Nd_{0.93}Mg_{0.07}(Ni_{0.95}Co_{0.02}Al_{0.03})_{3.5}$ | β3 | b3 | 0.0998 | $2.10 \times 10^3$ |
| Example 5 | $Nd_{0.91}Mg_{0.09}(Ni_{0.95}Co_{0.02}Al_{0.03})_{3.5}$ | β4 | b4 | 0.0998 | $2.10 \times 10^3$ |
| Example 2 | $Nd_{0.9}Mg_{0.1}(Ni_{0.95}Co_{0.02}Al_{0.03})_{3.5}$ | β1 | b1 | 0.0998 | $2.10 \times 10^3$ |
| Example 6 | $Nd_{0.87}Mg_{0.13}(Ni_{0.95}Co_{0.02}Al_{0.03})_{3.5}$ | β5 | b5 | 0.0998 | $2.10 \times 10^3$ |

| | Hydrogen equilibrium pressure (MPa) | | Assist output (W) | Regeneration Output (W) | Difference between assist and regeneration (W) |
|---|---|---|---|---|---|
| | immediately after manufacturing alloy | immediately after activation | | | |
| Example 4 | 0.07 | 0.08 | 189 | 189 | 0 |
| Example 5 | 0.06 | 0.07 | 197 | 196 | 1 |
| Example 2 | 0.06 | 0.07 | 197 | 197 | 0 |
| Example 6 | 0.06 | 0.07 | 200 | 196 | 4 |

TABLE 3

| | Composition | Composition type | Electrode plate type | Neg. electrode surface area ($m^2$) | A/S (1/m) |
|---|---|---|---|---|---|
| Example 2 | $Nd_{0.9}Mg_{0.1}(Ni_{0.95}Co_{0.02}Al_{0.03})_{3.5}$ | β1 | b1 | 0.0998 | $2.10 \times 10^3$ |
| Example 7 | $Nd_{0.9}Mg_{0.1}(Ni_{0.95}Co_{0.02}Al_{0.03})_{3.5}$ | β1 | b6 | 0.0760 | $1.59 \times 10^3$ |
| Example 8 | $Nd_{0.9}Mg_{0.1}(Ni_{0.95}Co_{0.02}Al_{0.03})_{3.5}$ | β1 | b7 | 0.0665 | $1.15 \times 10^3$ |

| | Hydrogen equilibrium pressure (MPa) | | Assist output (W) | Regeneration Output (W) | Difference between assist and regeneration (W) |
|---|---|---|---|---|---|
| | immediately after manufacturing alloy | immediately after activation | | | |
| Example 2 | 0.06 | 0.07 | 197 | 197 | 0 |
| Example 7 | 0.06 | 0.07 | 156 | 166 | 10 |
| Example 8 | 0.06 | 0.06 | 128 | 85 | 43 |

As is clearly shown by the hydrogen equilibrium pressure results in Tables 1 through 3, the batteries of Examples 1 through 8 and Comparative Examples 1 through 3 all exhibited substantially no difference between the hydrogen equilibrium pressure immediately after the alloy had been manufactured, and the hydrogen equilibrium pressure of the alloy after the battery had been manufactured and subsequently activated. The hydrogen equilibrium pressure immediately after the alloy had been manufactured can be readily calculated from the hydrogen equilibrium pressure of the alloy after the battery had been manufactured and subsequently activated.

(2) Measurement of Assist Output Characteristics and Regeneration Output Characteristics The batteries of Examples 1 through 8 and Comparative Examples 1 through 3, which were manufactured as described above, were charged to 50% of the SOC at a 1 It charge current and at 25° C., and charging was then halted for one hour. The batteries were then discharged for ten seconds at the discharge rate described below, and discharge was then halted for thirty minutes. The batteries were then charged for ten seconds at a charge rate that was equal to the discharge rate, and charging was then halted for thirty minutes. In this case, discharging and charging were performed while the discharge/charge current was increased in the sequence: discharging at 5 It, charging at 5 It, discharging at 10 It, charging at 10 It, discharging at 15 It, charging at 15 It, discharging at 20 It, charging at 20 It, discharging at 25 It, charging at 25 It.

In this case, measurements were made of the voltage (V) of the batteries of Examples 1 through 8 and Comparative Example 1 through 3 after ten seconds had passed at each of the discharge rates. The discharge rate (charge rate) was plotted on the horizontal axis (x axis), and the resulting battery voltage (V) was plotted on the longitudinal axis (y axis), and V-I characteristics were obtained. The output (I×V) when the battery voltage was 1.0 V was determined to be the discharge output (assist output), and the output (I×V) when the battery voltage is 1.6 V was determined to be the charge output (regeneration output). The results are shown in Tables 1 through 3.

The results of the hydrogen equilibrium pressures, the assist outputs, and the regeneration outputs of the batteries of Examples 1 through 8 and Comparative Examples 1 through 3 shown in Table 1 were used as a basis to create the graph shown in FIG. 2. The x axis shows the hydrogen equilibrium pressure (MPa), and the y axis shows the assist output values and regeneration output values. The results of the composition, assist outputs, and regeneration outputs of the batteries of Example 2 and Examples 4 through 6 shown in Table 2 were used as a basis to create the graph shown in FIG. 3. The x axis shows the Mg amount (molar ratio), and the y axis shows the assist output value and the regeneration output value. Similarly, the results of the A/S ratio (the ratio of the negative electrode surface area (A) to the battery capacity (S)), the assist outputs, and the regeneration outputs of the batteries of Examples 2, 7, and 8 shown in Table 3 were used as a basis to create the graph shown in FIG. 4. The x axis shows the A/S ratio, and the y axis shows the assist output value and the regeneration output value.

As is clear from the results shown in Table 1 and FIG. 2, in Examples 1 through 3 and Comparative Examples 1 through 3, the assist output improved as the hydrogen equilibrium pressure of the hydrogen storage alloy (indicated by the symbols ○ and □ in FIG. 2) increased, whereas the regeneration output (indicated by the symbols ● and ■ in FIG. 2) tended to decrease. It was apparent that the batteries used in Comparative Examples 1 through 3, in which were used $AB_5$ hydrogen storage alloy powders γ1 through γ3 having an average particle diameter of 25 μm, exhibited a dramatic decrease in regeneration output (indicated by the symbol ■ in FIG. 2) as the hydrogen equilibrium pressure increased.

It was apparent that the batteries of Examples 1 through 3, in which were used hydrogen storage alloys that had an average particle diameter of 25 μm, and were represented by the general formula $Ln_{1-x}Mg_x(Ni_{1-y}T_y)_z$ (wherein Ln represents at least one element selected from the group comprising a lanthanoid element, Ca, Sr, Sc, Y, Ti, Zr, and Hf; T represents at least one element selected from the group comprising V, Nb, Ta, Cr, Mo, Mn, Fe, Co, Al, Ga, Zn, Sn, In, Cu, Si, P, and B) such that $0<x\leq1$, $0\leq y\leq0.5$, and $2.5\leq z\leq4.5$, the regeneration output (indicated by the symbol ● in FIG. 2) decreases as the hydrogen equilibrium pressure increases, and is equal to the assist output when the hydrogen equilibrium pressure is 0.6 MPa. It is undesirable for the hydrogen equilibrium pressure (P) to be less than 0.02 MPa, because the ability to release hydrogen will dramatically deteriorate, and the battery performance will be unsatisfactory. It is also undesirable for the hydrogen equilibrium pressure (P) to exceed 0.11 MPa, because the battery characteristics will deteriorate dramatically as a result of an increase in pressure during storage and a dramatic increase in the hydrogen concentration in the battery.

Therefore, using a hydrogen storage alloy that satisfies the conditions described below, and setting the hydrogen equilibrium pressure (P) so that 0.02 MPa≦P≦0.11 MPa, makes it possible to provide an alkaline storage battery that has excellent assist output and regeneration output characteristics, and that is ideal for use in EVs, HEVs, and other applications in which charge/discharge efficiency is an important factor. The conditions are that the hydrogen storage alloy be represented by the general formula $Ln_{1-x}Mg_x(Ni_{1-y}T_y)_z$ (wherein Ln represents at least one element selected from the group comprising a lanthanoid element, Ca, Sr, Sc, Y, Ti, Zr, and Hf; and T represents at least one element selected from the group comprising V, Nb, Ta, Cr, Mo, Mn, Fe, Co, Al, Ga, Zn, Sn, In, Cu, Si, P, and B), and that $0<x\leq1$, $0\leq y\leq0.5$, and $2.5\leq z\leq4.5$.

Similarly, the results of Examples 1 through 6 shown in Tables 1 and 2 and FIGS. 2 and 3 show that the assist output and regeneration output will be substantially equal, and charging and discharging can be carried out most efficiently when Nd is the main constituent in Ln, and preferably when the percentage of Nd in Ln is 97% or more. It is evident that favorable results are obtained when $0<x\leq0.2$, $0<y\leq0.5$, $3.4\leq z\leq4.5$; and particularly when x falls within a range represented by $0.09\leq x\leq0.2$.

In HEV applications, which require high output, the average particle diameter of the hydrogen storage alloy is preferably 35 μm or less in view of the relationship between the alloy surface area and the reaction resistance. It is undesirable for the particle diameter to be less than 15 μm because the corrosion-resistance properties will deteriorate dramatically. Therefore, the optimal range of the average particle diameter R of the hydrogen storage alloy is 15 μm≦R≦35 μm.

The results shown in Table 3 and FIG. 4 clearly show that the regeneration output (indicated by ● in FIG. 4) and the assist output (indicated by ○ in FIG. 4) both tend to decrease with a decrease in the ratio A/S of the negative electrode surface area A to the battery capacity S. The regeneration output and the assist output decrease in a substantially similar manner until the ratio A/S of the negative electrode surface area A to the battery capacity S reaches $1.59\times10^3$/m. When A/S decreases further, the regeneration output will decrease dramatically. It can accordingly be assumed that the ratio A/S of the negative electrode surface area A to the battery capacity S is preferably set so that A/S≧$1.59\times10^3$/m.

The invention claimed is:

1. An alkaline storage battery, comprising:
   a negative electrode that has, as a negative electrode active material, a hydrogen storage alloy that is represented by the general formula $Ln_{1-x}Mg_x(Ni_{1-y}T_y)_z$ (wherein Ln represents at least one element selected from the group comprising a lanthanoid element, Ca, Sr, Sc, Y, Ti, Zr, and Hf; T represents at least one element selected from the group comprising V, Nb, Ta, Cr, Mo, Mn, Fe, Co, Al, Ga, Zn, Sn, In, Cu, Si, P, and B; $0<x\leq0.2$; $0<y\leq0.5$; and $3.4\leq z\leq4.5$);
   a positive electrode;
   a separator; and
   an alkaline electrolyte solution, which are provided inside a package can; said alkaline storage battery characterized in that
   an equilibrium pressure P of said hydrogen storage alloy is 0.02 MPa≦P≦0.11 MPa, at an H/M of 0.5 and at 40° C.;
   wherein
   Ln includes at least Nd, and the percentage of Nd in Ln is 97% or greater.

2. The alkaline storage battery according to claim 1, characterized in that in said hydrogen storage alloy represented by the general formula $Ln_{1-x}Mg_x(Ni_{1-y}T_y)_z$, $0.09\leq x\leq0.2$; $0\leq y\leq0.5$; and $3.4\leq z\leq4.5$.

3. The alkaline storage battery according to claim 1, characterized in that an average particle diameter R of said hydrogen storage alloy is such that 15 μm≦R≦35 μm.

4. The alkaline storage battery according to claim 1, characterized in that when a surface area of said negative electrode is assumed to be A ($m^2$) and the battery capacity is assumed to be S ($m^3$), a ratio A/S of said negative electrode surface area to said battery capacity is such that A/S≧$1.59\times10^3$/m.

* * * * *